(12) United States Patent
Mnih et al.

(10) Patent No.: US 11,049,008 B2
(45) Date of Patent: *Jun. 29, 2021

(54) REINFORCEMENT LEARNING USING TARGET NEURAL NETWORKS

(71) Applicant: DeepMind Technologies Limited, London (GB)

(72) Inventors: Volodymyr Mnih, London (GB); Koray Kavukcuoglu, London (GB)

(73) Assignee: DeepMind Technologies Limited, London (GB)

(*) Notice: Subject to any disclaimer, the term of this patent is extended or adjusted under 35 U.S.C. 154(b) by 931 days.

This patent is subject to a terminal disclaimer.

(21) Appl. No.: 15/619,393

(22) Filed: Jun. 9, 2017

(65) Prior Publication Data

US 2017/0278018 A1 Sep. 28, 2017

Related U.S. Application Data

(63) Continuation of application No. 14/097,862, filed on Dec. 5, 2013, now Pat. No. 9,679,258.

(60) Provisional application No. 61/888,247, filed on Oct. 8, 2013.

(51) Int. Cl.
| | |
|---|---|
| *G06N 3/08* | (2006.01) |
| *G06N 20/00* | (2019.01) |
| *G06N 3/04* | (2006.01) |
| *A63F 13/67* | (2014.01) |

(52) U.S. Cl.
CPC ............... *G06N 3/08* (2013.01); *A63F 13/67* (2014.09); *G06N 3/0454* (2013.01); *G06N 20/00* (2019.01)

(58) Field of Classification Search
None
See application file for complete search history.

(56) References Cited

U.S. PATENT DOCUMENTS

| | | |
|---|---|---|
| 7,892,080 B1 | 2/2011 | Dahl |
| 9,679,258 B2 | 6/2017 | Mnih et al. |
| 2010/0094788 A1 | 4/2010 | Schäfer et al. |
| 2010/0205974 A1 | 8/2010 | Schneegass et al. |
| 2013/0013543 A1 | 1/2013 | Düll et al. |
| 2013/0176146 A1 | 7/2013 | Dusparic et al. |
| 2013/0178952 A1 | 7/2013 | Wersborg et al. |
| 2013/0204812 A1 | 8/2013 | Sterzing et al. |
| 2014/0180989 A1 | 6/2014 | Krizhevsky et al. |
| 2015/0102945 A1 | 4/2015 | El-Tantawy et al. |
| 2015/0110597 A1 | 4/2015 | Düll et al. |

OTHER PUBLICATIONS

Wiering et al, Two Novel On-Policy Reinforcement Learning Algorithms based on TD($\lambda$)-methods (Year: 2007).*

(Continued)

*Primary Examiner* — Daniel T Pellett
(74) *Attorney, Agent, or Firm* — Fish & Richardson P.C.

(57) ABSTRACT

We describe a method of reinforcement learning for a subject system having multiple states and actions to move from one state to the next. Training data is generated by operating on the system with a succession of actions and used to train a second neural network. Target values for training the second neural network are derived from a first neural network which is generated by copying weights of the second neural network at intervals.

29 Claims, 10 Drawing Sheets

(56) References Cited

OTHER PUBLICATIONS

Lange, Sascha, Martin Riedmiller, and Arne Voigtländer. "Autonomous reinforcement learning on raw visual input data in a real world application." The 2012 international joint conference on neural networks (IJCNN). IEEE, 2012. (Year: 2012).*
Gabel, Thomas, Christian Lutz, and Martin Riedmiller. "Improved neural fitted Q iteration applied to a novel computer gaming and learning benchmark." 2011 IEEE Symposium on Adaptive Dynamic Programming and Reinforcement Learning (ADPRL). IEEE, 2011. (Year: 2011).*
Stollenga, M. F., M. A. Wiering, and L. R. B. Schomaker. "Using guided autoencoders on face recognition." Master's thesis (2011). (Year: 2011).*
Baccouche et al, "Sequential Deep Learning for Human Action Recognition," 2011, 11 pages.
Chen, Deep Learning of Invariant Spatio-temporal Features from Video, 2010, 55 pages.
Gabel et al., "Improved Neural Fitted Q Iteration Applied to a Novel Computer Gaming and Learning Benchmark," 2011 IEEE Symposium on Adaptive Dynamic Programming and Reinforcement Learning (ADPRL), IEEE, Apr. 11, 2011, pp. 279-286.
Giusti et al, "Fast Image Scanning with Deep Max-pooling Convolutional Neural Nets," 2013, 11 pages.
Hinton et al, "A Fast Learning Algorithm for Deep Belief Nets," 2010, 16 pages.
Hinton et al., "Neural Networks for Machine Learning: Lecture 6a, Overview of Mini-batch Gradient Descent," COURSERA, 2012, 31 pages.
Authorized officer Ahmed Soliman, International Search Report and Written Opinion in PCT/US2014/059511, dated Mar. 16, 2015, 25 pages.
Ji et al, "3D Convolutional Neural Networks for Human Action Recognition," IEEE Transactions on Pattern Analysis and Machine Intelligence, 2013, 35(1):221-231.
Lange et al., "Autonomous Reinforcement Learning on Raw Visual Input Data in a Real World Application," the 2012 International Joint Conference on Neural Networks (IJCNN), IEEE, Jun. 10, 2012, pp. 1-8.
Lin, "Reinforcement Learning for Robots Using Neural Networks," Dissertation, Jan. 6, 1993, pp. 1-168.
Moore and Atkeson, "Prioritized Sweeping: Reinforcement Learning with Less Data and Less Real Time," Machine Learning, 1993, 13:103-130.
Parker et al, Neuro-visual Control in the Quake II Game Engine, 2008, 6 pages.
Riedmiller, "Neural Fitted Q Iteration—First Experiences with a Data Efficient Neural Reinforcement Learning Method," Machine Learning: ECML 2005, Springer 2005, pp. 317-328.
Stollenga, "Using Guided Autoencoders on Face Recognition," University of Groningen, May 10, 2011, Retrieved from the Internet: URL:http://www.ai.rug.nl/'mwiering/thesis_marijn_stonenga.pdf, [retrieved on Feb. 24, 2015].
Tesauro, "Temporal Difference Learning and TD-Gammon," Communications of the ACM, 1995, 38(3)58-68, 16 pages.
Watkins and Dayan, "Q-learning," Machine Learning, 1992, 8:279-292.
Lange and Riedmiller, "Deep Auto-encoder Neural Networks in Reinforcement Learning," the 2010 International Joint Conference on Neural Networks (IJCNN), IEEE, Jul. 18-23, 2010, pp. 1-8.
Office Action issued in Chinese Application No. 201480055621.8, dated Mar. 21, 2018, 20 pages (with English translation).
CN Office Action in Chinese Appln. No. 201480055621.8, dated Dec. 2, 2019, 24 pages (with English translation).
CN Office Action in Chinese Appln No. 201480055621.8, dated May 7, 2019, 12 pages (with English translation).
CN Office Action in Chinese Appln. No. 201480055621.8, dated Nov. 3, 2020, 43 pages (with English translation).
EP Search Report in European Appln. No. 20172810.2, dated Dec. 4, 2020, 11 pages.
Hasselt, "Double Q-Learning," Proceedings of Advances in Neural Information Processing Systems 23, Dec. 2010, 9 pages.
IN Office Action in Indian Appln. No. 201647015710, dated Feb. 8, 2021, 8 pages (with English translation).

* cited by examiner

REINFORCEMENT LEARNING USING TARGET NEURAL NETWORKS

CROSS-REFERENCE TO RELATED APPLICATIONS

This is a continuation of U.S. application Ser. No. 14/097,862, filed on Dec. 5, 2013, which claims priority to U.S. Provisional Application No. 61/888,247, filed on Oct. 8, 2013. The disclosures of the prior applications are considered part of and are incorporated by reference in the disclosure of this application.

FIELD OF THE INVENTION

This invention relates to improved techniques for reinforcement learning, in particular Q-learning, and to related data processors and processor control code.

BACKGROUND TO THE INVENTION

Broadly speaking, reinforcement learning differs from supervised learning in that correct input-output pairs are not presented but instead a machine (software agent) learns to take actions in some environment to maximise some form of reward or minimise a cost. Taking an action moves the environment/system from one state to another and in the particular case of Q-learning the Quality of a state-action combination is calculated, this describing an action-value function which can be used to determine the expected utility of an action. The Q-learning algorithm is described in "Q-learning," Machine learning, vol. 8, pages 279-292, 1992, Watkins, Christopher JCH and Dayan, Peter and conveniently summarised, for example, on Wikipedia™.

Nonetheless learning to control software agents directly from high-dimensional sensory inputs such as vision and speech is one of the long-standing challenges of reinforcement learning (RL). Most successful RL applications that operate in these domains have relied on hand crafted features combined with linear policy functions, and the performance of such system relies heavily on the quality of the feature representation. On the other hand, learning representations of sensory data has been the focus of deep learning methods, most of which have relied on large supervised training sets applied to deep convolutional neural networks.

Perhaps the best known success of reinforcement learning using a neural network is TD-Gammon "Temporal difference learning and TD-Gammon," Communications of the ACM, vol. 38(3), pages 58-68, Tesauro, Gerald. This was a backgammon-playing program which learnt by reinforcement learning and self-play and achieved a super-human level of play. However, this approach employed human-engineered features and a state value function independent of actions (a total score), rather than an action-value function. Moreover, it did not accept a visual input.

Early attempts to follow up on TD-Gammon were relatively unsuccessful—the method did not work well for chess, go and checkers. This lead to a widespread belief that TD-Gammon was a special case, and that the neural network could only approximate the value function in backgammon because it is very smooth, due to stochasticity in the dice rolls.

It was also shown that combining model-free reinforcement learning algorithms such as Q-learning with non-linear function approximators such as a neural network could cause the Q-network to diverge. Thus subsequent work focussed on linear function approximators with better convergence guarantees. In addition to concerns about the convergence, it is also unclear whether the training signal provided by reinforcement learning is sufficient for training large neural networks. Thus while many successful applications of convolutional neural networks benefit from using a large set of labelled training examples (supervised learning), the reward signal provided by RL is often delayed, sparse and noisy.

There has, nonetheless, been an attempt to use a multi-layer perceptron to approximate a Q-value function, in "Neural fitted Q iteration—first experiences with a data efficient neural reinforcement learning method," Machine Learning: ECML 2005, Springer 2005, pages 317-328, Riedmiller, Martin. The technique described there is based on the principle of storing and reusing transition experiences but has some significant practical disadvantages: broadly speaking a neural network is trained based on the stored experience, and when the experience is updated with a new (initial state—action—resulting state) triple the previous neural network is discarded and an entirely new neural network is trained on the updated experience. This is because otherwise the unsupervised training could easily result in divergent behaviour. However, a consequence is that there is a computational cost per update that is proportional to the size of the data set, which makes it impractical to scale this approach to large data sets. The same approach has been applied to visual input preprocessed by an auto-encoder, but this suffers from substantially the same problem ("Deep Auto-Encoder Neural Networks in Reinforcement Learning," Sascha Lange and Martin Riedmiller).

There is therefore a need for improved techniques for reinforcement learning, in particular when neural networks are employed.

SUMMARY OF THE INVENTION

According to the present invention there is therefore provided a method of reinforcement learning, the method comprising: inputting training data relating to a subject system, the subject system having a plurality of states and, for each state, a set of actions to move from one of said states to a next said state; wherein said training data is generated by operating on said system with a succession of said actions and comprises starting state data, action data and next state data defining, respectively for a plurality of said actions, a starting state, an action, and a next said state resulting from the action; and training a second neural network using said training data and target values for said second neural network derived from a first neural network; the method further comprising: generating or updating said first neural network from said second neural network.

Broadly speaking in embodiments of this aspect of the invention two neural networks are maintained to avoid the divergences which can otherwise occur when estimating an action-value parameter, in particular where a neural network would otherwise be updated based on its own predictions. In embodiments, the first neural network generates a target action-value parameter, such as a target Q-value, and the second neural network is updated based on the target generated by the first. In this way the target remains substantially stationary, but at intervals the first neural network is regenerated or updated from the second neural network, for example by copying some or all of a set of weights learnt by the second neural network to the first neural network. In effect, in embodiments, two instances of the same neural network are maintained, a first instance being used to generate the target values for updating the second, from time to time updating the first instance to match the second. Potentially in a locally connected network different portions of the network could be updated at different times, but this is less preferable. In one embodiment the first neural network is updated after a defined number of actions, for example every $10^4$ steps.

Employing this approach facilitates scaling to very large data sets because the computation involved in training the second neural network is reduced—in embodiments this second neural network is effectively continuously updated with a low (constant) computational cost per iteration, for example employing a stochastic gradient update. This in turn facilitates the use of very large quantities of training data and, in particular, the use of sensory data such as image data or sound data (waveforms) for the state data. Embodiments of the technique may be trained directly on visual images and/or sound, and thus the reinforcement learning may be applied 'end to end,' from this input to the output actions. This enables learning of features that may be directly relevant to discriminating action-values rather than, say, having to try to identify these by hand. A further advantage is that because large quantities of low-level data are available a front end of the neural networks may implement a (deep) convolutional neural network, trained by the unsupervised, reinforcement learning technique. In this way the system can itself learn to discriminate features of the sensory input which are relevant to the available actions which can be performed.

A still further advantage of embodiments of the above described system is that they can be operated online without the problems of previous approaches—the second neural network can be updated as each successive action is performed and data on each successive state captured.

In embodiments the second neural network is provided with a representation of the first, starting state for each successive action and is used to provide a learnt action-value parameter, in embodiments a Q-value, for each action of the set of actions available from this starting state. The method then selects an action to perform and outputs corresponding action data for controlling the subject system. This in turn is used to generate experience data, which is stored and provided to the first neural network to generate target values for training the second neural network. An approach of this type is advantageous in itself generating the experience through which the procedure (or data processor) learns: In effect each neural network provides an output which is used by the other. However, this is not essential and experience data for processing by the first neural network may, in principle, be derived from some other source, for example by observing the interaction of another entity, machine or human, with the subject system.

The action selected by the method is that which corresponds to the optimum learnt action-value parameter from the second neural network. This is generally a maximum action-value parameter for a network which has learnt to maximise (expected) reward, or a minimum action-value parameter for a network which has learnt to minimise (expected) cost. In some preferred embodiments, rather than the second neural network receiving data defining the starting state and actions, instead the neural network is trained to provide a set of outputs in parallel for a defined starting state, each output providing an estimated action-value parameter for a corresponding available action. This substantially speeds up operation by effectively processing the actions in parallel, allowing a subsequent selector module (either code/software, or hardware), coupled to the outputs of the neural network, to select the maximum/minimum output value, the node with this value defining the corresponding action to be taken.

As previously mentioned, in preferred embodiments of the approach an experience data store records experience data for some or all of the actions taken. The experience data comprises, for each action, data defining the starting state, the action taken, and the subsequent state of the system. In embodiments the experience data only relating to the last N actions is stored, to reduce memory requirements. However additionally or alternatively a subset of the actions may be selected for storage in some other way, for example only storing actions at intervals, or storing actions at random, or storing actions based on some measure of salience, either determined contemporaneously or determined at some later stage, for example based on measured and/or expected reward/cost.

In embodiments the experience data includes reward (or cost) data relating to a reward (or cost) of the action in moving from a current state to a subsequent state. The reward/cost may be measured from the system, for example by inputting data defining a reward or cost collected/incurred by the action. Additionally or alternatively however, the reward/cost may be defined by parameters of the system or engineering problem to be solved. Thus it will be recognised that it is not essential to store the reward/cost because, particularly in this latter case, it may be defined by or associated with a state: For example a reward/cost it may be defined by a target region of state space for, say, an avoidance control task, goal-reaching task, or state space-location regulation task, such as a pole balancing task.

In embodiments the experience data is used in conjunction with the first neural network for training the second neural network. More particularly a transition comprising a first, starting state, action, and next state is sampled from the stored experience data. This is used to generate a target action-value parameter (Q-value) from the first neural network (which is, in embodiments, a previously made copy of the second neural network), for training the second neural network. Thus the next state, resulting from the action, is input to the first neural network and the maximum (or minimum) action-value parameter (Q-value) is identified, is optionally discounted by a discount factor between 0 and 1, and the reward in moving from the starting state to the next state is added (or the cost subtracted) to generate a target action-value parameter for the starting state given the action. Broadly speaking, the target for step/state j, $Q_j$ is the determined by the best Q for step/state j+1, $Q_{j+1}$ plus the reward (or less the cost). This can be understood by recognising that at state j+1 the reward has been received so is not expected anymore and does not appear in $Q_{j+1}$, so this is added back in to create the target $Q_j$. In some preferred implementations the reward (or cost) is recorded in the experience data store when storing data for a transition, but in other implementations it may defined, for example by a definition of the problem or system as previously described.

The second neural network is trained on the modulus difference between the target generated from the first neural network and the action-value parameter at step j output from the second neural network, adjusting the weights of the second neural network by (stochastic) gradient descent. Optionally the size of step adjusting the weights may be varied based on the history of calculated adjustments for faster convergence, for example using the RMS-Prop procedure (described later). In embodiments, therefore, the second neural network is trained by incrementally updating its weights rather than by resetting the network with each new observation. The skilled person will appreciate that the updating may be performed once with each action or less frequently; optionally a minibatch from the experienced data store may be employed to calculate a gradient for updating the weights.

A transition for training the second neural network may be selected at random from the experience data store and/or it may be selected based upon its expected salience, for example based upon the value of an associated reward or cost.

In some preferred embodiments a state of the system comprises a sequence of observations of the system over time that is a history of the system. This is particularly helpful where an unobserved internal state of the system depends upon a sequence of actions and observations, as is often the case. A further observation of a sensed condition of the subject system, for example a new captured image, may be used to update a system state comprising a sequence of such observations.

In embodiments a state is defined by image data, more particularly a sequence of images. The image data representing a state may be in colour or monochrome; optionally it may be pre-processed to reduce the number of pixels in the image and hence the processing requirements. Where a state comprises a sequence of image frames not every frame in a succession of frames needs to be employed and, for example, every nth frame may be selected.

Additionally or alternatively, a state may comprise sound data, more particularly an audio waveform, again optionally pre-processed. More generally a state may be defined by sensory information from one or more sensors, or by data captured from or over a computer network, or by real-world data in general and, potentially, by data representing any real or virtual system which may be affected by actions of a software agent.

Preferably the first and second neural networks are deep neural networks and include a front end portion (an input portion receiving state data) which is locally or sparsely connected, for example, to implement a convolutional neural network. In this way the front end of the network can effectively provide a hierarchical set of filters, each processing information from a local region of the input for the state data, learning to recognise local structure. This is particularly advantageous for processing image data, audio data, and real-world derived data because such data tends to exhibit relevant local structure. This approach allows internal, hidden layers of the network to represent feature maps for a plurality of features, in a hierarchical manner at the front end. In some preferred embodiments the neural network is, however, fully connected at least at an output layer.

The above described techniques may be implemented in software, for example as code running on a digital signal processor (DSP) or parallelised across multiple processors, for example GPUs (graphics processing units), or on a general purpose computer system. Alternatively the above described techniques may be implemented in hardware, for example as electronic circuitry, say on an ASIC (application specific integrated circuit); or a combination of hardware and software may be employed.

Thus in a related aspect the invention provides a processor configured to perform reinforcement learning, the system comprising: an input to receive training data from a system having a plurality of states and, for each state, a set of actions to move from one of said states to next said state; wherein said training data is generated by operating on said system with a succession of said actions and comprises starting state data, action data and next state data defining, respectively for a plurality of said actions, a starting state, an action, and a next said state resulting from the action; wherein said actions are selected responsive to an action-value parameter for each action of said set of actions available at each state; selecting said actions using learnt action-value parameters from a second neural network; and a training module to train a second neural network using said training data and target values derived from a first neural network; and a neural network generation module to generate or update said first neural network from said second neural network.

Optionally some or all of the previously described preferred features may be incorporated into such a data processor.

In a related aspect the invention provides a method of Q-learning wherein Q values are determined by a neural network and used to select actions to be performed on a system to move the system between states, wherein a first neural network is used to generate a Q-value for a target for training a second neural network used to select said actions.

As previously described, in some preferred embodiments at intervals the first neural network is refreshed using a second neural network such that weights of the first neural network are quasi-stationary, only updating at intervals when refreshed. Likewise as previously described, in preferred embodiments a record is stored of experiences interacting with the system. An experience may comprise a state, action, new state and reward/cost. In embodiments the second neural network learns off-policy, that is the learning policy involves going through the stored experience to generate targets used to train the second neural network, and this is done in a way which is different to the behaviour policy used to select actions when interacting with the system. In embodiments the Q-value for the target comprises a value of an action-value function approximating an expected cost of or return from a strategy of actions including a defined or putative next action.

In a related aspect the invention also provides a data processor configured to perform Q-learning, wherein Q values are determined by a neural network and used to select actions to be performed on a system to move the system between states, the data processor comprising a processor coupled to working memory and to non-volatile program memory storing processor control code, wherein said processor control code is configured to control said processor to: generate a Q-value for a target using a first-neural network; train a second neural network using said target; and select actions to control said system using said second neural network.

A data processor as described above may, for example, be incorporate into a control system configured to automatically learn a control task.

The invention also provides processor control codes and/or data (for example learnt weights) to implement embodiments of the invention, in particular on a physical (non-transitory) data carrier such as a disk, programed memory, for example on non-volatile memory such as Flash or in Firmware. Code and/or data to implement embodiments of the invention may comprise source, object or executable code in a conventional programming language (interpreted or compiled) such as C, or code for a hardware description language.

In a further aspect the invention provides an electronic controller trained by reinforcement-learning to control a system having a plurality of states and, for each state, a set of actions to move from one of said states to next said state; the electronic controller comprising: an input to receive state data from said system; a neural network having a set of input neurons coupled to said input, a plurality of hidden layers of neurons, and at least one output neuron, wherein said neural network is trained to provide, for each of said set of actions, an action quality value defining an expected cost of or reward from a strategy of actions beginning with the respective action to move to a next state; an action selector configured to select an action from said set of actions responsive to the action quality values for said actions; and an output to output data defining said selected action for controlling said system.

In some preferred embodiments the neural network has a plurality of output neurons, each configured to provide an action quality value for a respective action. These may then be coupled to the action selector so that action quality values may be provided substantially in parallel for selecting an action, for example that which has a maximum or minimum quality value.

In a further related aspect the invention provides a method of learning in a control system the method comprising, for a succession of states of a subject system: inputting current state data relating to a current state of a subject system; providing a version of said current state data to a neural network; determining, using said neural network, values for a set of action-value functions, one or each of a set of potential actions; selecting a said action responsive to said values of said action-value functions; outputting action data for said selected action to said subject system such that said subject system transitions from said current state to a subsequent state; inputting subsequent state data relating to said subsequent state of said subject system and reward data relating to a reward or cost resulting from said transition from said current state to said subsequent state; storing, in said experience memory, experience data representing said current state, said subsequent state, said selected action, and said reward or cost; determining a target action-value function output for said neural network from said stored experience data; and updating weights of said neural network using said target action-value function output, wherein said updating comprises incrementally modifying a previously determined set of weights of said neural network; the method further comprising: storing a set of weights of said neural network to create two versions of said neural network, one time-shifted with respect to the other, wherein said determining of said values of said set of action-value functions for selecting said action is performed using a later version of said neural network versions, and wherein said determining of said target action-value function is performed using an earlier version of said neural network versions.

Here the reference to reward data is used in a general sense to include data defining a positive reward or a negative reward or cost.

In a further related aspect the invention provides a control system, the system, comprising: a data input to receive sensor data; a data output to provide action control data; and a deep neural network having an input layer coupled to said data input and an output layer; and an action selector coupled to said output layer of said deep neural network; wherein said input layer of said deep neural network defines a sensor data field in one or more dimensions, wherein said output layer of said deep neural network defines a value for an action-value function associated with each of a plurality of possible actions for said control system to control; and an action selector, coupled to said output layer of said deep neural network and to said data output, to select a said action responsive to said action-value function and to provide corresponding action control data to said data output.

BRIEF DESCRIPTION OF THE DRAWINGS

These and other aspects of the invention will now be further described, by way of example only, with reference to the accompanying figures in which.

DETAILED DESCRIPTION OF PREFERRED EMBODIMENTS

Figure 1:
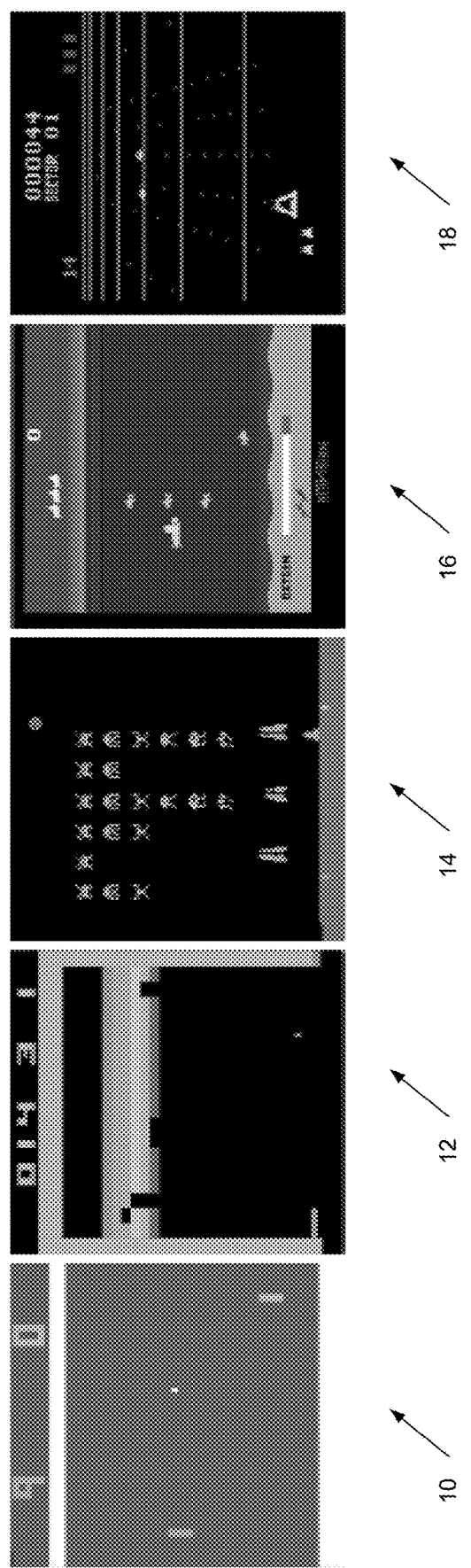
FIG. 1 shows screen shots from a set of computer games used for training a reinforcement learning data processor according to an embodiment of the invention to play the games showing, from left to right, Pong, Breakout, Space Invaders, Seaquest, and Beam Rider (trade marks)

We will describe a technique which connects reinforcement learning algorithm to a deep neural network, such that data can be efficiently pumped into the algorithm using stochastic gradient updates, directly from raw RGB pixel images. To that end an online implementation of the Q-learning algorithm with an experience replay memory is described, that makes it possible to train a neural network with stochastic gradient updates. (Here "deep neural network" is used to refer to a neural network with more than one hidden layer).

In order to demonstrate the power of the approach Atari™ 2600 video games from the Arcade Learning Environment "The arcade learning environment: An evaluation platform for general agents," arXiv preprint arXiv:1207.4708, 2012, Bellemare, Marc G and Naddaf, Yavar and Veness, Joel and Bowling, Michael are used as a test bed. These games provide an interesting challenge for reinforcement learning because they were designed to be challenging for humans and have a high-dimensional visual input space. The software agents described learn to play Atari™ games directly from the raw pixel inputs and do not use any hand-designed features or examples of human play. The neural network-based method described herein achieved a level of competency comparable to or better than a beginner human player on all seven games tested and surpassed an expert human play on three of the games.

Reinforcement Learning Framework

We consider tasks in which an agent interacts with an environment E, in this case the Atari emulator, in a sequence of actions, observations and rewards. At each time-step the agent selects an action $a_t$ from the set of legal game actions, $A=\{1, \ldots, K\}$. The action is passed to the emulator and modifies its internal state and the game score. In general E may be stochastic. The emulator's internal state is not observed by the agent; instead it observes an image $x_t \in R^d$ from the emulator, which is a vector of raw pixel values representing the current screen. In addition it receives a reward $r_t$ representing the change in game score. Note that in general the game score may depend on the whole prior sequence of actions and observations; feedback about an action may only be received after many thousands of time-steps have elapsed.

Since the agent only observes images of the current screen, the task is partially observed and many emulator states are perceptually aliased, i.e., it is impossible to fully understand the current situation from only the current screen $x_t$. We therefore consider sequences of actions and observations, $s_t = x_1, a_1, x_2, \ldots, a_{t-1}, x_t$, and learn game strategies that depend upon these sequences. All sequences in the emulator are assumed to terminate in a finite number of time-steps. This formalism gives rise to a large but finite Markov decision process (MDP) in which each sequence is a distinct state. As a result, we can apply reinforcement learning methods for MDPs, by using the complete sequence $s_t$ as the state representation at time t.

The goal of the agent is to interact with the emulator by selecting actions in a way that maximises future rewards. We make the assumption that future rewards are discounted by a factor of $\gamma$ per time-step (where $0 \le \gamma \le 1$), and define the future discounted return at time t as $R_t = \sum_{t'=t}^{T} \gamma^{t'-t} r_{t'}$, where T is the time-step at which the game terminates. We define the optimal action-value function $Q^*(s, a)$ as the maximum expected return achievable by following any strategy, after seeing some sequence s and then taking some action a, $Q^*(s, a) = \max_\pi E[R_t | s_t = s, a_t = a, \pi]$, where $\pi$ is a policy mapping sequences to actions (or distributions over actions).

The optimal action-value function obeys an important identity known as the Bellman equation. This is based on the following intuition: if the optimal value $Q^*(s', a')$ of the sequence s' at the next time-step was known for all possible actions a', then the optimal strategy is to select the action a' maximising the expected value of $r + \gamma Q^*(s', a')$, $$Q^*(s, a) = E_{s' \Box E}\left[ r + \gamma \max_{a'} Q^*(s', a') \Big| s, a \right] \quad (1)$$

In some equations contained herein, the symbol "☐" appears due to an artifact generated by the equation generator used to create equations. This symbol should appear and be understood to mean "~".

The basic idea behind many reinforcement learning algorithms is to estimate the action-value function, by using the Bellman equation as an iterative update, $Q_{i+1}(s, a) = E[r + \gamma \max_{a'} Q_i(s', a') | s, a]$. Such value iteration algorithms converge to the optimal action-value function, $Q_i \to Q^*$ as $i \to \infty$. In practice, this basic approach is totally impractical, because the action-value function is estimated separately for each sequence, without any generalisation. Instead, one can use a function approximator to estimate the action-value function, $Q(s, a; \theta) \approx Q^*(s, a)$. This is typically a linear function approximator, but may be a non-linear function approximator such as a neural network. We refer to a neural network function approximator with weights $\theta$ as a Q-network. A Q-network can be trained by minimising a sequence of loss functions $L(\theta_i)$ that changes at each iteration i, $$L_i(\theta_i) = E_{s, a \Box \rho(\cdot)}[(y_i - Q(s, a; \theta_i))^2], \quad (2)$$

where $y_i = E_{s' \Box E}[r + \gamma \max_{a'} Q(s', a'; \theta_{i-1}) | s, a]$ is the target for iteration i and $\rho(s, a)$ is a probability distribution over sequences s and actions a that we refer to as the behaviour distribution. The parameters from the previous iteration $\theta_{i-1}$ are held fixed when optimising the loss function $L(\theta_i)$. Note that the targets depend on the network weights; this is in contrast with the targets used for supervised learning, which are fixed before learning begins. Differentiating the loss function with respect to the weights we arrive at the following gradient, $$\nabla_{\theta_i} L(\theta_i) = \quad (3)$$
$$E_{s, a \Box \rho(\cdot); s' \Box E}\left[ \left( r + \gamma \max_{a'} Q(s', a'; \theta_{i-1}) - Q(s, a; \theta_i) \right) \nabla_{\theta_i} Q(s, a; \theta_i) \right].$$

Rather than computing the full expectations in the above gradient, it is often computationally expedient to optimise the loss function by stochastic gradient descent. If the weights are updated after every time-step, and the expectations are replaced by single samples from the behaviour distribution p and the emulator E respectively, a Q-learning algorithm is obtained.

This algorithm is model-free: it solves the reinforcement learning task directly using samples from the emulator E, without explicitly constructing an estimate of E. It is also off-policy: it learns about the "greedy" (i.e., best value favouring)) strategy $a = \max_a Q(s, a; \theta)$, while following a behaviour distribution that ensures adequate exploration of the state space. In practice, the behaviour distribution is often selected by an $\epsilon$-greedy strategy that follows the greedy strategy with probability $1 - \epsilon$ and selects a random action with probability $\epsilon$.

Example Tasks

In some environments a relatively small number of inputs fully describes the environment's state, and there is a single task of interest, so it is possible to hand construct features that are tailored to the tasks. In contrast, the Atari emulator used to test embodiments of the techniques we describe is partially observable, providing 210×160 RGB video input at 60 Hz, and since there are a wide variety of tasks to consider it would be hard to handcraft general—purpose features.

The Atari™ games were designed to be challenging for human players and the Atari™ 2600 represents a major challenge for reinforcement learning. Nonetheless we describe a reinforcement learning algorithm that can play a wide variety of Atari™ 2600 console games well. The learning task is designed to mirror the set up that a human might face, if presented with a novel Atari™ game: the software agent is not provided with any prior knowledge about the game, it is not privy to the internal state of the emulator, and can only interact with the emulator by observing pixel video input, and by selecting one of up to 18 actions (3×3 joystick positions, with a choice of whether or not to press the "fire" button) at each frame.

The Arcade Learning Environment (ALE) (ibid) is a platform enabling reinforcement learning agents to interact with an emulator of the Atari™ 2600 console. It contains many of the original Atari™ 2600 console games, instrumented by a reward function that typically corresponds to the change in score at each frame. FIG. 1 shows example screen shots of five games used to test embodiments of the invention, illustrating Pong 10, Breakout 12, Space Invaders 14, Seaquest 15, and Beam Rider 18 (trade marks).

Deep Reinforcement Learning

Figure 2:
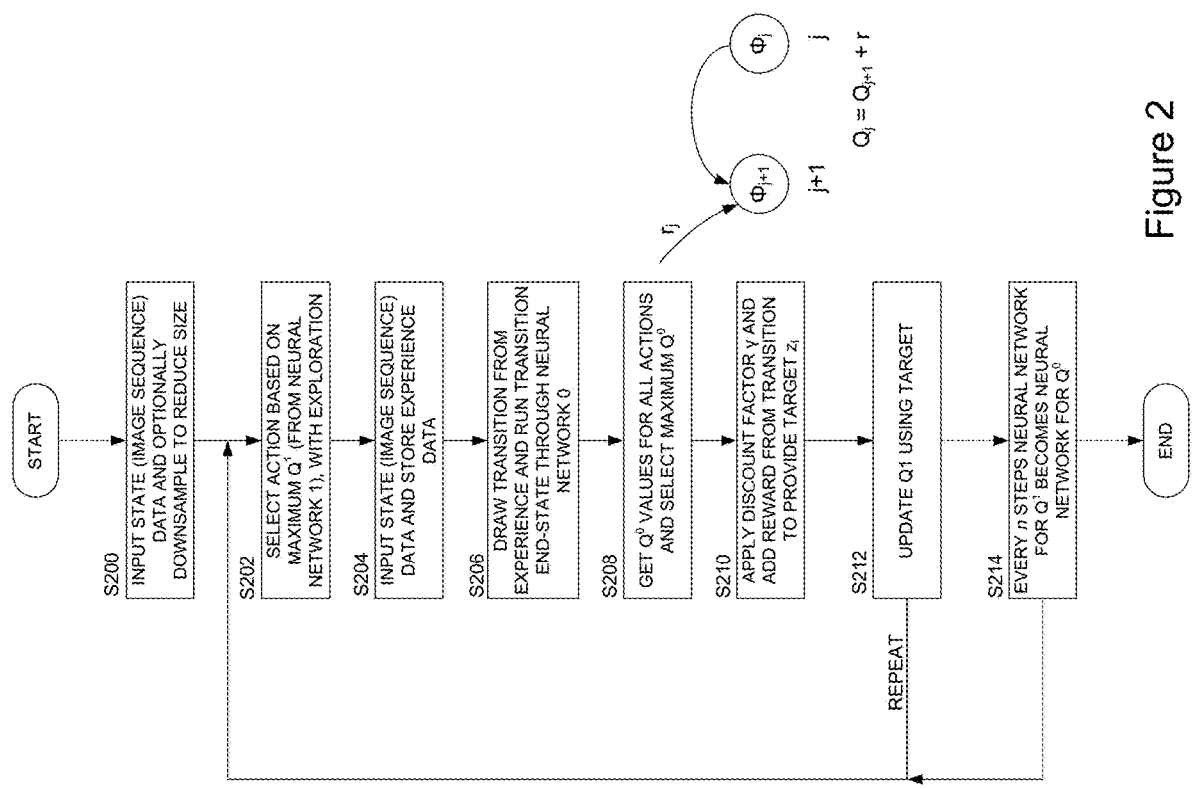
FIG. 2 shows flow diagram of a deep Q-learning procedure with experience replay according to an embodiment of the invention.

FIG. 2 illustrates a procedure for reinforcement learning using a deep neural network to estimate Q-values, according to an embodiment of the invention.

The procedure begins by inputting state data from a controlled system (S200). For the test system of an Atari™ game emulator this comprised a sequence of image frames from the game. As described later, in this test environment frame-skipping was employed, and the captured images were down-sampled to reduce the quantity of data to be processed. One of the advantages of the approach we describe is that the procedure is able to accept image pixel data as an input rather than relying on a hand-constructed representation of the system under control.

The procedure employs first and second neural networks (neural networks 0 and 1), each of which ends up being trained through implementation of the procedure to provide action-value parameters, more particularly Q-values, for each action or each definable input state. Thus at step S202 the procedure employs the second neural network (neural network 1) to provide, for the input state, a set of Q-values, one for each possible action at that state ($Q^1$-values). The procedure selects the maximum Q-value (maximum expected reward), but also employs an exploration strategy, in embodiments an $\epsilon$-greedy strategy (selecting a random action $\epsilon$ of the time). The skilled person will appreciate, however, that many types of exploration strategy may alternatively be employed—for example a soft-max strategy based on, say, a Gibbs or Boltzmann distribution; or a variant of $\epsilon$-greedy exploration may be employed in which $\epsilon$ decreases over time.

The procedure then again inputs state (image sequence) data and stores experience data (S204). The stored experience data comprises the before and after states, the action taken, and the reward earned. At step S206, the procedure draws a transition from the stored experience data, either randomly or according to a prioritised strategy, and provides the end, 'after' state of the transition to the first neural network (neural network 0). The first neural network is employed to determine the maximum Q-value for this end state (step S208), by providing a Q-value ($Q^0$-value) for each action so that the maximum can be selected. Then, at step S210 the procedure applies a discount factor, $\gamma$, to the maximum Q-value from step S208, and adds the reward from the transition to this end state, to provide a target Q-value ($y_j$ in the algorithm below). In this described embodiment the reward is stored with the experience data (for the test systems the reward was defined by a numerical output from the emulator), but it may be provided in some other manner for example as part of the definition of a control problem (say by defining a target region of state space to be within, or to avoid). The logic behind adding the reward is illustrated to the right of step S210—the Q-value output from neural network 0 takes into account the reward which has by that stage been received and thus it is by then no longer expected.

The target Q-value ($y_j$) is used to train the second neural network (neural network 1), to update the $Q^1$-values. Conveniently the training may be implemented using stochastic gradient descent, for example using back-propagation, optionally employing an adjustable or adaptive learning rate to decrease the step size over time (that is, the step size used to adjust the weights). Optionally, as the skilled person will appreciate, the gradients may be accumulated over a plurality of transitions drawn from the stored experience data, in a minibatch approach. The skilled person will recognise that, rather than a neural network being trained on its own output, the output of the first neural network is used to train the second neural network.

The procedure then loops back from step S212 to step S202 to select a further action. In embodiments the size of the experience data store is limited and therefore, as new experience data is stored, older experience data may be discarded, for example using a FIFO (first in first out) strategy. After a defined number of training steps, for example every $10^2$, $10^3$, or $10^4$ steps, the weights from the second, trained neural network are copied across to the first neural network (S214) so that, in effect, the neural network for the $Q^1$-values becomes the neural network for the $Q^0$-values, and the training of the second neural network proceeds. The training procedure may continue indefinitely or, in other approaches, the training may be terminated, for example after a predetermined number of training steps and/or based on a training metric such as an average predicted state-value function for a defined set of states.

As described the procedure operates online or quasi-online (the latter if minibatch training is employed). However, the skilled person will appreciate that in alternative embodiments the procedure may accumulate stored experience data in one phase and then train the second neural network using the stored experience data in a second phase.

An example algorithm for deep Q-learning with experience replay is shown below. In order to improve the stability of the algorithm we decouple the network used to generate the targets $y_j$ from the network being trained. More precisely, a copy of the Q network being trained is made after every L parameter updates and used to generate the targets $y_j$ for the next L training updates. This procedure improves stability of the training algorithm because the network used to generate the targets changes only every L updates, which prevents feedback loops from occurring in which predictions grow uncontrollably.

---

Initialize replay memory D to capacity N
Initialize action-value function Q with random weights
for episode = 1, M do
   Initialise sequence $s_1 = \{x_1\}$ and preprocessed sequence $\phi_1 = \phi(s_1)$
   for t = 1, T do
   With probability $\epsilon$ select a random action $a_t$
   otherwise select $a_t = \mathrm{argmax}_a Q^*(\phi(s_t), a; \theta)$
   Execute action $a_t$ in emulator and observe reward $r_t$ and image $x_{t+1}$
   Set $s_{t+1} = s_t, a_t, x_{t+1}$ and preprocess $\phi_{t+1} = \phi(s_{t+1})$
   Store transition $(\phi_t, a_t, r_t, \phi_{t+1})$ in D
   Sample random transition $(\phi_j, a_j, r_j, \phi_{j+1})$ from D $$\text{Set } y_j = \begin{cases} r_j & \text{for terminal } \varphi_{j+1} \\ r_j + \gamma \mathrm{argmax}_{a'} Q^0(\varphi_{j+1}, a'; \theta) & \text{for non-terminal } \varphi_{j+1} \end{cases}$$

Perform a gradient descent step on $(y_j - Q^1(\phi_j, a_j; \theta))^2$ according to equation 3
   end for
end for

---

In some preferred embodiments the algorithm is modified to accumulate gradients over a minibatch of stored transitions:

---

Initialize replay memory D to capacity N
Initialize action-value function Q with random weights
for episode = 1, M do
   Initialise sequence $s_1 = \{x_1\}$ and preprocessed sequence $\phi_1 = \phi(s_1)$
   for t = 1, T do -continued

```
With probability ε select a random action a_t
otherwise select a_t = argmax_a Q*(φ(s_t), a;θ)
Execute action a_t in emulator and observe reward r_t and image x_{t+1}
Set s_{t+1} = s_t, a_t, x_{t+1} and preprocess φ_{t+1} = φ(s_{t+1})
Store transition (φ_t, a_t, r_t, φ_{t+1}) in D
Sample random minibatch of transitions (φ_j, a_j, r_j, φ_{j+1}) from D
```

$$\text{Set } y_j = \begin{cases} r_j & \text{for terminal } \varphi_{j+1} \\ r_j + \gamma \text{argmax}_{a'} Q^0(\varphi_{j+1}, a'; \theta) & \text{for non-terminal } \varphi_{j+1} \end{cases}$$

```
Perform a gradient descent step on (y_j − Q^1(φ_j, a_j; θ))^2 according
to equation 3
end for
end for
```

In the example algorithms above the procedure runs over M game episodes, where each episode runs from the start of a game to the point at which 'game over' is signalled or to the point at which the (software agent) player loses a life. The total number of frames in an episode is denoted T; the neural networks have parameters (weights) θ, which may be initialised with random numbers. It will be appreciated that in other implementations other forms of 'episode' may be defined, or the procedure may be run continuously. In the illustrated example the algorithm runs for all the frames captured whilst the system is playing a game.

It will be recalled that a state of the game/system is defined by a sequence of image frames or, more generally, a sequence of captured sets of input data which may comprise image data, and/or sound data, and/or sensor data in general, and/or other input data. In the above algorithms preprocessed sequence data defining an input state is denoted $\varphi_i$ where i labels the state. In the test environment σ defined a group of four 84×84 greyscale images obtained by selecting every kth frame.

In the above examples the algorithms learn off-policy—that is the actions selected to train the second neural network are different to those indicated by the first neural network used for playing the game—that is embodiments of the procedure learn and play from different policies.

In principle embodiments of the procedure may be operated without storing the results of the actions selected by the second neural network in the experience data store: the stored experience may be derived from some other source, for example by observing some other entity interacting with the system, such as observing a human playing the relevant game. All that is required is to be able to observe multiple transitions each comprising an initial state, an action, and a final state and, optionally, a reward (or cost). The stored experience may then still be used to update the first neural network, which in turn generates targets for training the second neural network. In practice it is convenient to store the experience of actions selected by the second neural network so that the first neural network can draw from these later, thus providing a self-contained system, but this is not essential.

In the above algorithms we store the agent's experiences at each time-step, $e_t=(s_t, a_t, r_t, s_{t+1})$ in a data-set $D=e_1, \ldots, e_N$, pooled over many episodes into a replay memory. During the inner loop of the algorithm, Q-learning updates, or minibatch updates, are applied to samples of experience, e □ D, drawn at random from the pool of stored samples. After performing experience replay, the agent selects and executes an action according to an ε-greedy policy (where 0≤ε≤1 and may change over time). Since using histories of arbitrary length as inputs to a neural network can be difficult, the Q-function instead works on fixed length representation of histories produced by a function φ.

The approach of the algorithms we describe has several advantages. There are no interactions, each step of experience is potentially used in many weight updates, which allows for greater data efficiency. Second, learning directly from consecutive samples is inefficient due to the strong correlations between the samples, but randomizing the samples breaks these correlations and therefore reduces the variance of the updates. Third, when learning on-policy the current parameters determine the next data sample that the parameters are trained on. For example, if the maximizing action is to move left then the training samples will be dominated by samples from the left-hand side; if the maximizing action then switches to the right then the training distribution will also switch. It is easy to see how unwanted feedback loops may arise and the parameters could get stuck in a poor local minimum, or even diverge catastrophically. By contrast, in the technique we describe the behavior distribution is averaged over many of its previous states, smoothing out learning and helping to avoid oscillations or divergence in the parameters. When learning by experience replay, leaning is off-policy because the current parameters are different to those used to generate the sample, which motivates the choice of Q-learning.

In some embodiments the algorithm only stores the last N experience tuples in the replay memory, and samples uniformly at random from D when performing updates. However this approach is limited since the memory buffer does not differentiate important transitions and overwrites with recent transitions due to the finite memory size N. Similarly, the uniform sampling gives equal importance to all transitions in the replay memory. In other embodiments, therefore, a more sophisticated sampling strategy may be employed, for example to emphasize transitions from which the procedure can learn the most. This may be implemented in a manner similar to prioritized sweeping "Prioritized Sweeping: Reinforcement Learning with Less Data and Less Real Time," Machine Learning, vol. 13, pages 103-130, 1993, Andrew Moore, Chris Atkeson.

While the reinforcement learning framework described above uses complete sequences $s=s_1, a_1, \ldots, s_t, a_t$ as the state representation this is challenging in practice, typically requiring a recurrent neural network architecture that can back propagate errors over thousands of time-steps. Thus, instead, embodiments of the technique use a short history of frames, for example 4 frames, as a pre-processing step.

As previously mentioned, in embodiments the training loop of the algorithm samples a minibatch of transitions and performs minibatch gradient descent update on the given objective. A variant uses the RMSProp algorithm "Lecture 6.5-rmsprop: Divide the gradient by a running average of its recent magnitude," COURSERA: Neural Networks for Machine Learning, 2012, Tieleman, T and Hinton, G, which adaptively determines a learning rate for each weight. This leads to faster training on some problems.

Embodiments also use a frame-skipping technique: The agent sees and selects actions on every kth frame instead of every frame, and its last action is repeated on skipped frames. It is coincidental that the number of skipped frames is the same as the number of frames constituting a state-representation: this need not be the case. Since running the emulator forward for one step requires much less computation than having the agent select an action, this technique allows the agent to play roughly k times more games without significantly increasing the runtime.

Pre-Processing and Model Architecture

Working directly with raw Atari™ frames, which are 210×160 pixel images with a 128 color palette, can be computationally demanding so a basic pre-processing step was used to reduce the input dimensionality: The raw frames were pre-processed by first converting their RGB representation to grey-scale representation and then down-sampling it to a 110×84 image. The final input representation was obtained by cropping an 84×84 region of the image that roughly captures the playing area. The final cropping stage was done only for convenience, because a GPU (graphics processing unit) implementation of 2D convolutions was used which expected square inputs. For the experiments the function φ from the algorithm applied this pre-processing to the last 4 frames of a history and stacked them to produce the input to the Q-function.

Figure 3A:
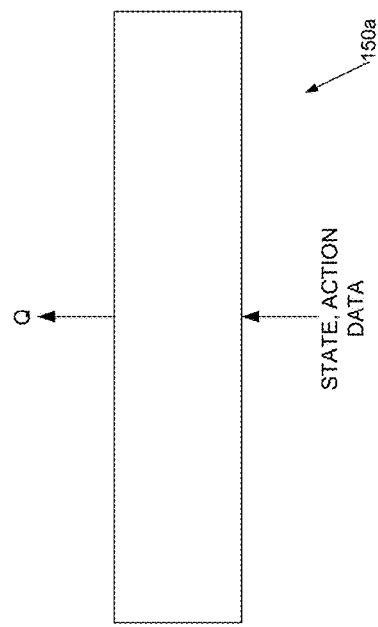
FIGS. 3a and 3b show alternative example configurations of a Q-learning deep neural network according to an embodiment of the invention.
Figure 3B:
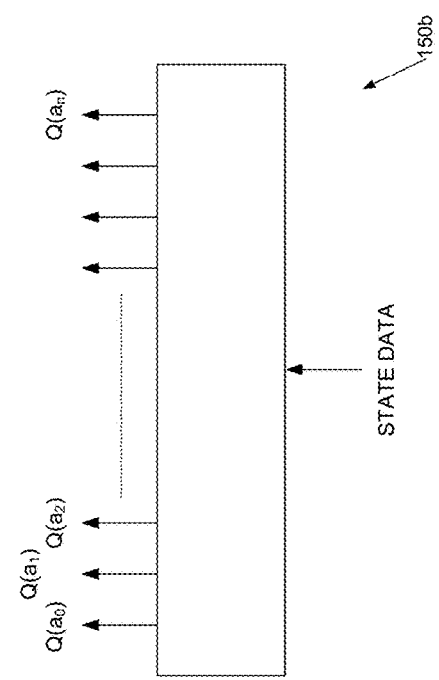

There are several potential ways of parameterizing Q using a neural network. Since Q maps history-action pairs to scalar estimates of their Q-value, using both the history and the action have been used as inputs to the neural network is one option, illustrated schematically for neural network 150a in FIG. 3a. However, a drawback of this type of architecture is that a separate forward pass is required to compute the Q-value of each action, resulting in a cost that scales linearly with the number of actions. Thus instead preferred embodiments employed an architecture in which there is a separate output unit for each possible action, and only the state representation is an input to the neural network. The outputs correspond to the predicted Q-values of the individual action for the input state, as shown schematically for neural network 150b in FIG. 3b. One advantage of this type of architecture is the ability to compute Q-values for all possible actions in a given state with only a single forward pass through the network.

Figure 4:
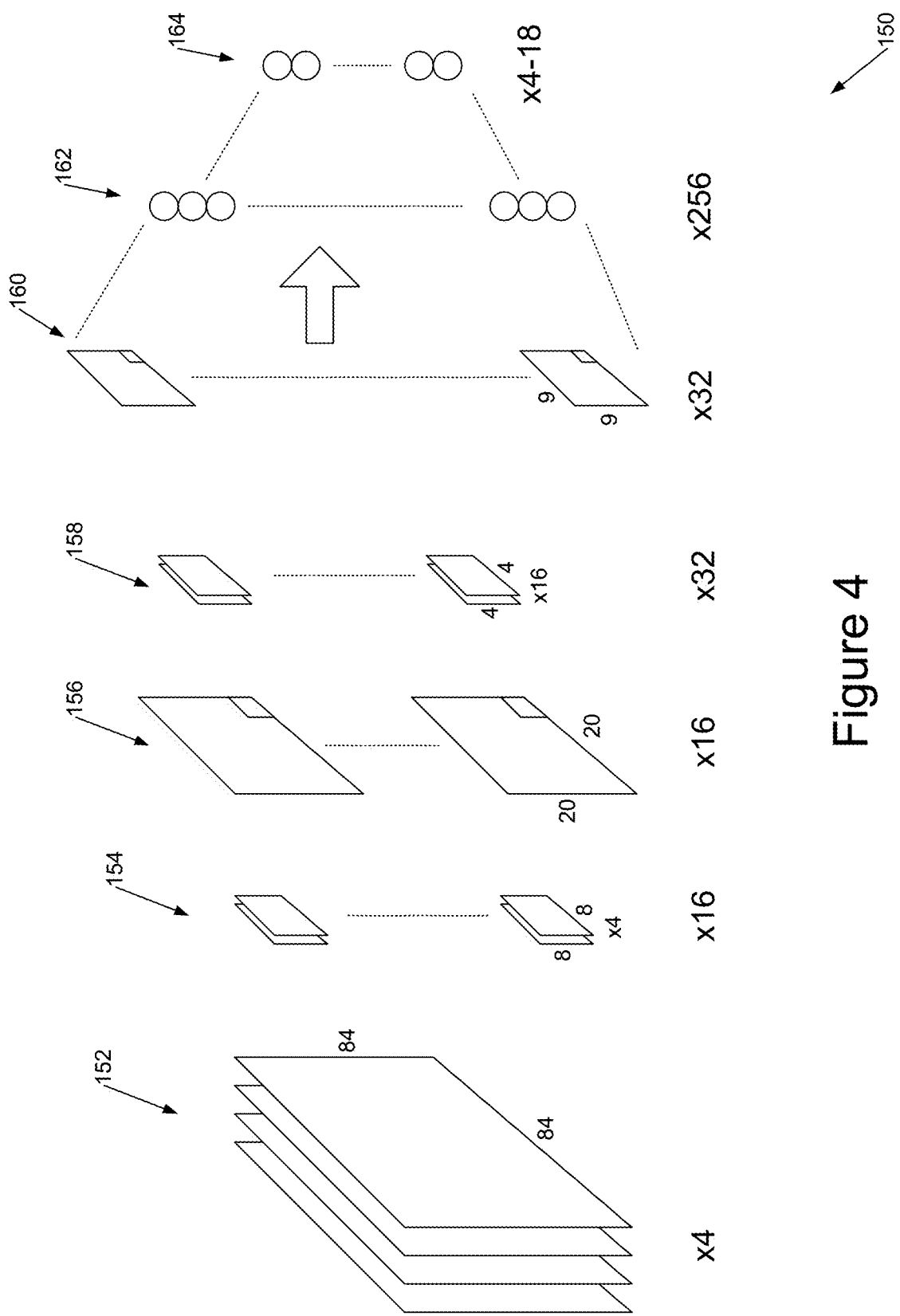
FIG. 4 illustrates a structure of a neural network used in an embodiment of the procedure of FIG. 2.

The architecture used for training all seven Atari™ games, illustrated in FIG. 4, is as follows: The input to the neural network comprises an 84×84×4 image produced by φ. The first hidden layer convolves 16 8×8 filters with stride 4 with the input image and applies a rectifier nonlinearity. The second hidden layer convolves 32 4×4 filters with stride 2, again followed by a rectifier nonlinearity. The final hidden layer is fully-connected and comprises 256 rectifier units. The output layer is a fully-connected linear layer with a single output for each valid action. The number of valid actions varied between 4 and 18 for the games considered. We refer to convolutional networks trained with the described approach as Deep Q-Networks (DQN).

Thus referring to FIG. 4, this shows an embodiment of neural network 150 as described above in which a set of input frames 152 provides an input to a first set of convolutional filters 154 formed by connections to a first hidden layer 156. First hidden layer 156 contains a set of feature maps, one for each filter. A second set of convolutional filters 158 provides connections to a second hidden layer 160 which comprises a further set of feature maps, one for each of filters 158. The output stage of neural network 150 comprises, in effect, a multilayer perceptron with a set of input hidden units 162 connected to all the feature maps in layer 160 below, and having a set of output units 164, one for each available action (between 4 and 18 actions in the example games). In the illustrated example the first set of 4×16 8×8 pixel filters (kernels) operating on the set of (84×84) (×4) input frames generates a set of 16 20×20 feature maps for each set of 4 frames, and the second set of 16×32 4×4 pixel filters operating on these generates 32 9×9 feature maps for each frame. The neural network structure of FIG. 4 corresponds to the arrangement shown in FIG. 3b, in which state data 152 presented at the input of the neural network generates a set of Q-value outputs on output units 164, one for each action.

Figure 5A:
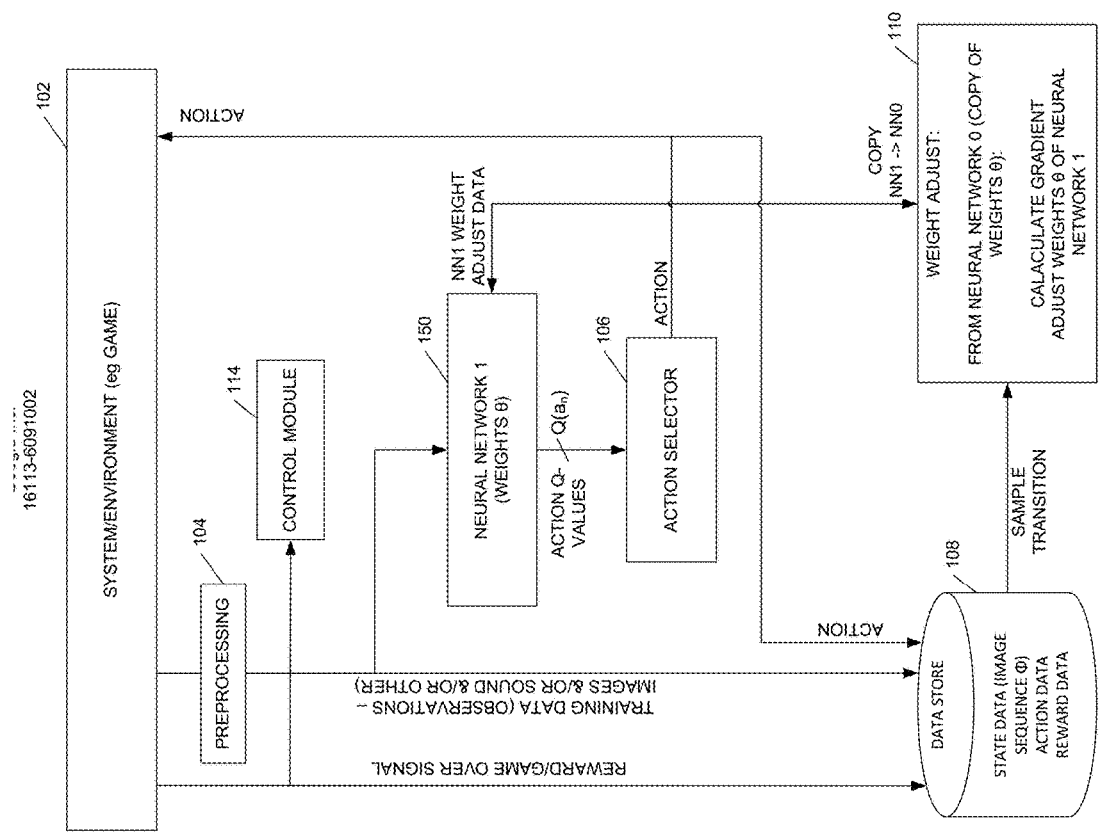
FIGS. 5a and 5b show, respectively, a block diagram of a reinforcement learning processor according to an embodiment of the invention, and an example of a computer system programmed to implement a deep neural network-based Q-learning procedure according to an embodiment of the invention.

FIG. 5a shows a schematic block diagram of a data processor 100 configured to implement a neural network-based reinforcement learning procedure as described above. The processor interacts with some system 102, providing actions to control the system and observing image, sound or other data from the system. In embodiments, there are also inputs to the processor from cost or reward data from the system and, in the case of a game, a 'game over' signal. The observed data is pre-processed by module 104 and then processed by neural network 150 as previously described. This provides a set of action-value parameters (Q-values) as outputs for the observed input state. An action selector 106 selects the action with the maximum Q-value and provides this to a system 102 as well as to experience data store 108. The experience data store 108 stores the observed state data, for example image sequence data, selected actions, and reward data from system 102.

During a learning phase module 110 samples the transition from the experience data store 108 and adjusts the weights of neural network 150 (neural network 1) based on a target from neural network 0, an earlier copy of neural network 1 having weights stored in module 110. Thus in embodiments the actions selected by neural network 1 provide stored experience data from which neural network 0 draws, to provide targets for training neural network 1.

Figure 5B:
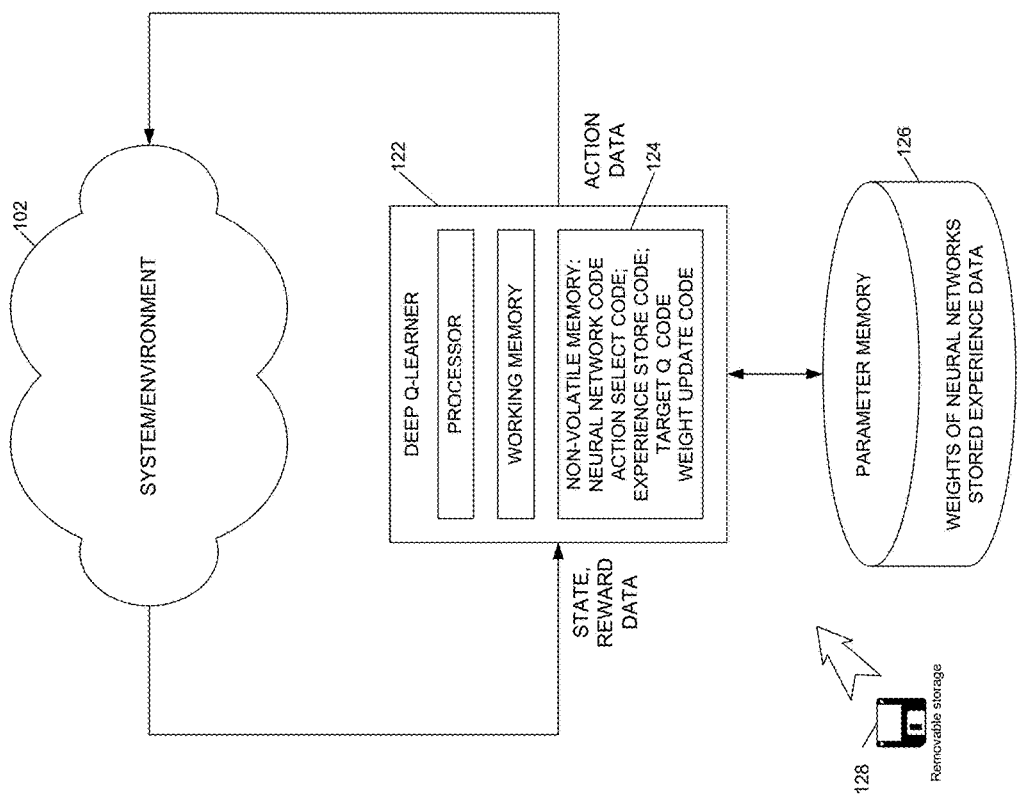

FIG. 5b shows a general purpose computer system 100 programmed to implement corresponding functions to those illustrated in FIG. 5b. Thus the system comprises a deep Q-learner 122 incorporating a processor, working memory, and non-volatile program memory 124. The program memory stores, inter alia, neural network code, action select code experience store code, target Q generation code and weight update code. Parameter memory 126 stores the weights of the neural networks and the experience data. The code 124 may be provided on a physical carrier medium such as disk 128.

Experimental Results

Experiments were performed on seven popular Atari™ games—Beam Rider, Breakout, Enduro, Pong, Q*bert, Seaquest, Space Invaders, using the same network architecture, learning algorithm and hyperparameters settings across all seven games. However, since the scale of scores varies greatly from game to game, all positive rewards were fixed to be 1 and all negative rewards to be −1, leaving 0 rewards unchanged. Clipping the rewards in this manner limits the scale of the error derivatives and makes it easier to use the same learning rate across multiple games. At the same time, it could affect the performance of the agent since it cannot differentiate between rewards of different magnitude.

In these experiments, the RMSProp algorithm was used with minibatches of size 32. The behavior policy during training was ϵ-greedy with ϵ annealed linearly from 1 to 0.1 over the first million frames, and fixed at 0.1 thereafter. We trained for a total of 10 million frames and used a replay memory of one million most recent frames. Also a simple frame-skipping technique was used: The agent sees and selects actions on every $k^{th}$ frame instead of every frame, and its last action is repeated on skipped frames. Since running the emulator forward for one step requires much less computation than having the agent select an action, this technique allows the agent to play roughly k times more games without significantly increasing the runtime. In the test implementation k=4 was used for all the games except Space Invaders™ where this makes lasers invisible because of the period at which they blink; using k=3 avoids this problem and this change was the only difference in hyperparameter values between any of the games.

In supervised learning, one can easily track the performance of a model during training by evaluating it on the training and validation sets. In reinforcement learning, however, accurately evaluating the progress of an agent during training can be challenging. The evaluation metric used is the total reward the agent collects in an episode or game averaged over a number of games, periodically computed during training. However, the average total reward metric tends to be very noisy because small changes to the weights of a policy can lead to large changes in the distribution of states the policy visits.

Figure 6A:
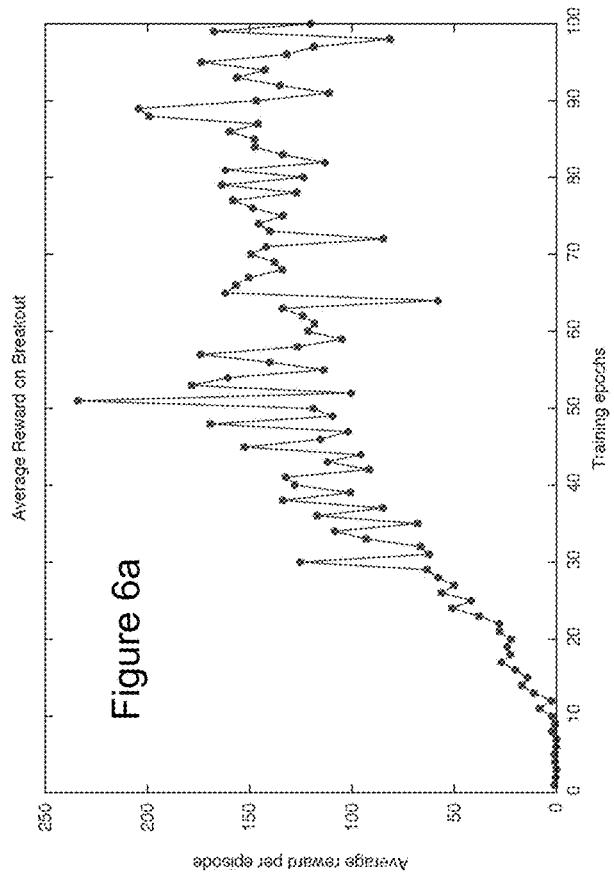
FIGS. 6a to 6d show reward per game episode showing, respectively, average reward per episode and the average predicted value obtainable from a set of starting states, for Breakout™ and for Seaquest™.
Figure 6B:
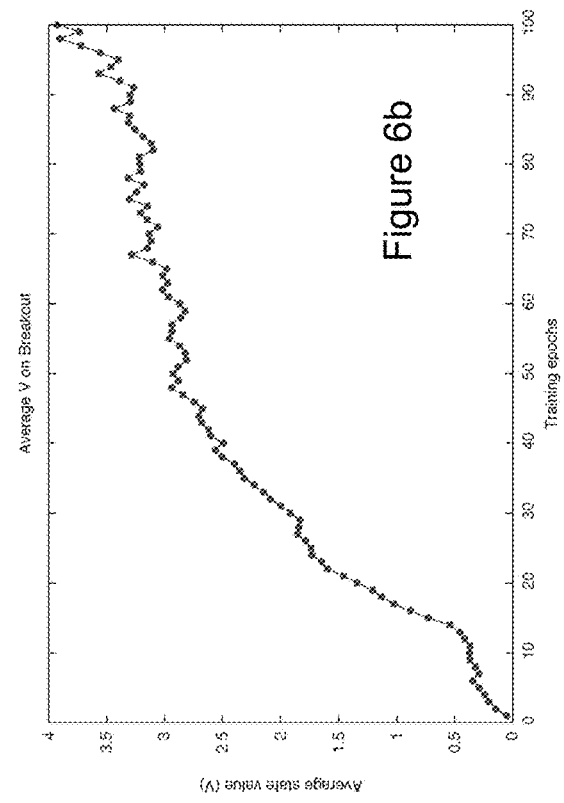
Figure 6C:
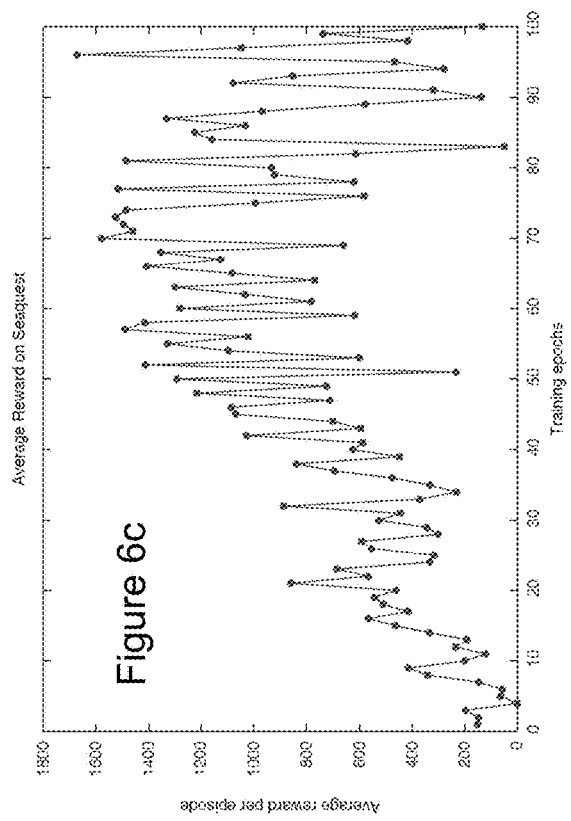

Referring to FIG. 6, FIGS. 6a and 6c show the average reward per episode on Breakout™ and Seaquest™ respectively during training. The statistics were computed by running an $\epsilon$-greedy policy with $\epsilon$=0.05 for 10,000 steps. FIGS. 6b and 6d show the average maximum predicted action-value of a set of states in Breakout™ and Seaquest™ respectively. In FIG. 6 the X axis of the plots shows training epochs; one epoch corresponds to 50,000 minibatch weight updates, approximately 30 minutes of training time.

Figure 6D:
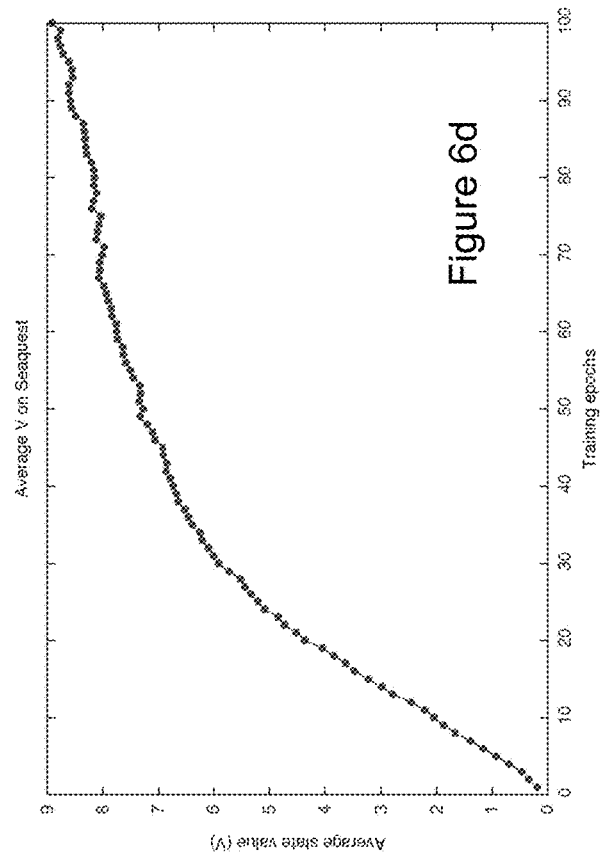

FIGS. 6a and 6b show how the average total reward evolves during training on the games Seaquest and Breakout. Both averaged reward plots are quite noisy, giving one the impression that the learning algorithm is not making steady progress. Another, more stable, metric is the policy's estimated action-value function Q, which provides an estimate of how much discounted reward the agent can obtain by following its policy from any given state. A fixed set of states was collected by running a random policy before training starts and track the average of the maximum predicted Q for these states (the maximum for each state is taken over the possible actions). FIGS. 6b and 6d show that average predicted Q increases much more smoothly than the average total reward obtained by the agent and plotting the same metrics on the other five games produces similarly smooth curves. In addition to seeing relatively smooth improvement to predicted Q during training no divergence issues were seen in any of the experiments. This suggests that, despite lacking any theoretical convergence guarantees, the method is able to train large neural networks using a reinforcement learning signal and stochastic gradient descent in a stable manner.

Figure 7A:
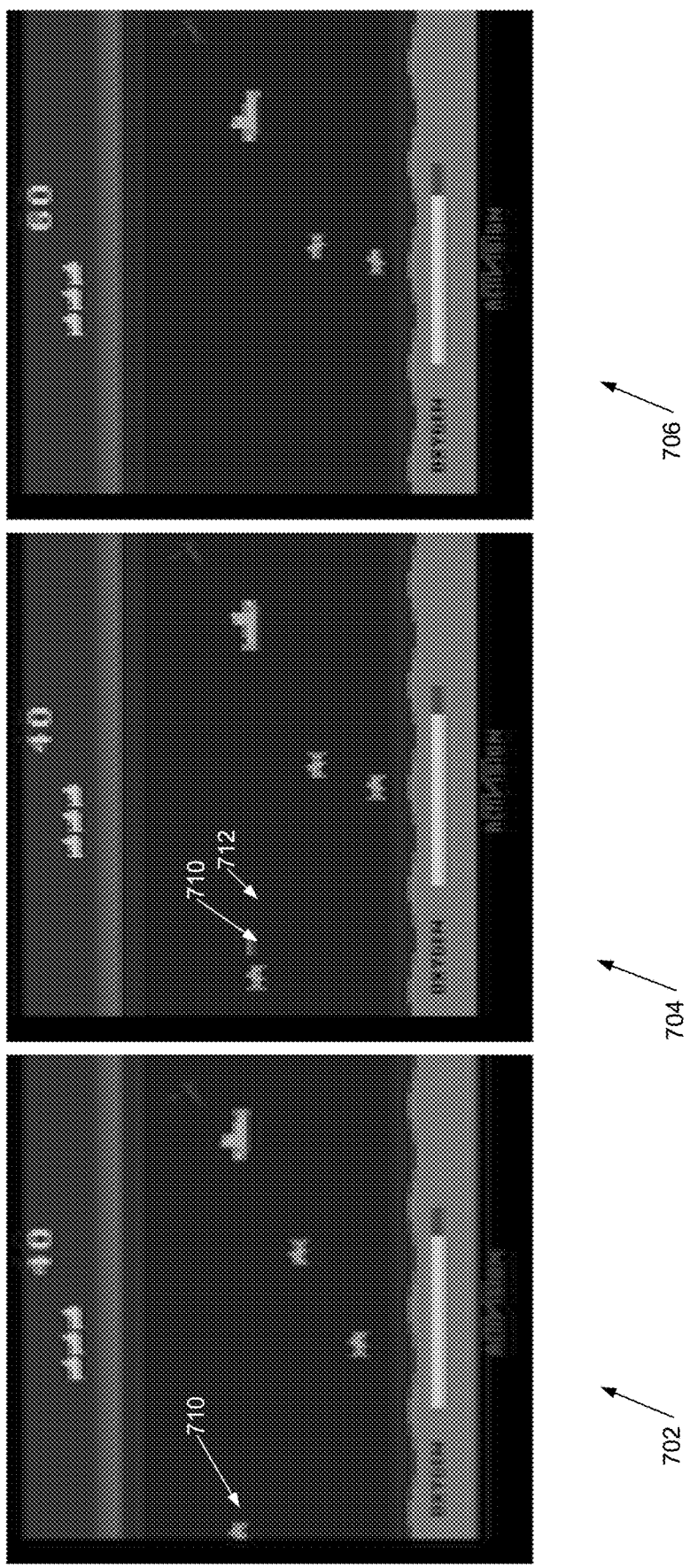
FIGS. 7a and 7b show, respectively, a sequence of three screen shots from Seaquest™, and a predicted value function for a corresponding 30 frame segment of gameplay where A, B and C correspond to the left, middle and right screen shots of FIG. 7a respectively.
Figure 7B:
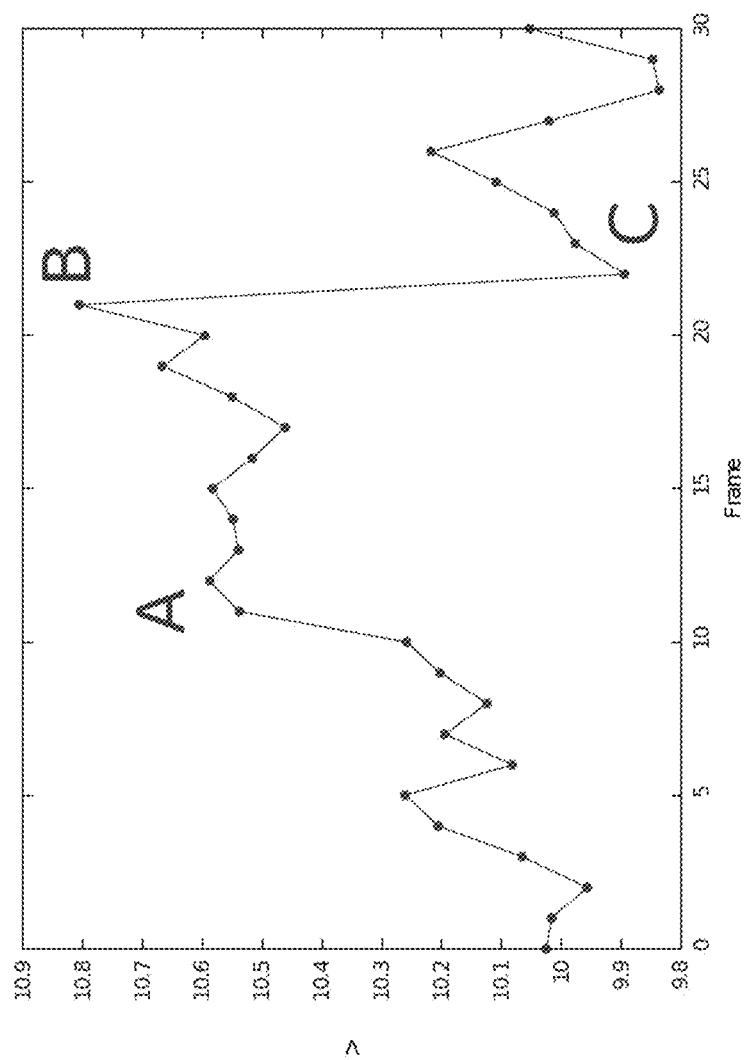

FIG. 7 shows a visualization of the learned value function on the game Seaquest™ FIG. 7a shows that the predicted value jumps after an enemy appears on the left of screen 702 (point A). The agent then fires a torpedo at the enemy and the predicted value peaks as the torpedo is about to hit the enemy (point B; screen 704). Finally, the value falls to roughly its original value after the enemy disappears (point C; screen 706). FIG. 7 demonstrates that embodiments of the method are able to learn how the value function evolves for a reasonably complex sequence of events. Whenever a new submarine appears, the value increases reflecting the fact that the agent has the opportunity to collect more points. As soon as the enemy submarine is shot, the value goes back down since the potential reward is collected.

During tests the procedure we have described outperformed all other machine learning methods against which it was compared, by a substantial margin on all seven games, despite incorporating almost no prior knowledge about the form of input. The procedure is able to use raw pixels as an input and was tested with no adjustment of the architecture or hyperparameters of the procedure and demonstrated its ability to master difficult control policies in this context.

The performance of the procedure was also tested against an expert human player, and, as shown in Table 1 below (which gives figures for average total reward) achieves better performance than an expert human player on most of the games. The games on which performance was inferior to that of a human performance are more challenging because they require the network to find a strategy that extends over long time scales.

TABLE 1

| | B. Rider | Breakout | Enduro | Pong | Q*bert | Seaquest | S. Invaders |
|---|---|---|---|---|---|---|---|
| Human | 7456 | 31 | 368 | −3 | 18900 | 28010 | 3690 |
| DQN Best | 5184 | 225 | 661 | 21 | 4500 | 1740 | 1075 |

We have described an application of the reinforcement learning procedure to a control task which uses an image data input—for example in the case of a card game an image of a hand in the game may be used as an input. However, the skilled person will appreciate that, as previously described, other types of input data may additionally or alternatively be employed. Moreover, the task of controlling a game has been described by way of example only, and it will be appreciated that embodiments of the invention may be applied to any form of control task. Although an example with discrete actions has been described, additionally or alternatively the control task may involve a quasi-continuous action such as an action defined by a continuous-valued variable represented by a binary number.

Further applications of the techniques we describe, which are merely given by way of example, include: robot control (such as bipedal or quadrupedal walking or running, navigation, grasping, and other control skills); vehicle control (autonomous vehicle control, steering control, airborne vehicle control such as helicopter or plane control, autonomous mobile robot control); machine control; control of wired or wireless communication systems; control of laboratory or industrial equipment; control or real or virtual resources (such as memory management, inventory management and the like); drug discovery (where the controlled action is, say, the definition or DNA sequence of a drug and the states are defined by states of a living entity to which the drug is applied); application to a system in which the state of or output from the system is defined by words (text and/or audio and/or image), such as a system employing natural language; application to a trading system such as a stock market (although the actions taken may have little effect on such a system, very small effects can be sufficient to achieve useful overall rewards); and others.

No doubt many other effective alternatives will occur to the skilled person. It will be understood that the invention is not limited to the described embodiments and encompasses modifications apparent to those skilled in the art lying within the spirit and scope of the claims appended hereto.

What is claimed is:

1. A method of reinforcement learning performed by one or more computers, the method comprising:
   obtaining training data relating to a subject system being interacted with by a reinforcement learning agent that performs actions from a set of actions to cause the subject system to change states;
   wherein the training data is generated by performing a succession of actions from the set of actions to interact with the environment and comprises a plurality of transitions each including respective starting state data defining a respective starting state of the environment, respective action data defining a respective action from the set of actions, and respective next state data defining respective next state resulting from the respective action being performed; and training a second neural network using the training data and target values for the second neural network derived from a first neural network; and updating the first neural network from the second neural network.

2. A method as claimed in claim 1 further comprising selecting the actions performed to generate the training data using learnt action-value parameters obtained as output from the second neural network, wherein the actions are selected responsive to respective action-value parameters for each action of a set of actions available at a state of the subject system that are generated by the second neural network.

3. A method as claimed in claim 2, the method further comprising generating the transitions by storing data defining actions selected using the second neural network in association with data defining respective starting states and next states for the actions.

4. A method as claimed in claim 3 further comprising generating the target values by providing at least the data defining the next states as input to the first neural network, and training the second neural network using the target values and the data defining the starting states.

5. A method as claimed in claim 4 further comprising:
selecting a first transition comprising first starting state data, first action data, and first next state data;
providing the first neural network with a representation of the first next state data;
determining, from the first neural network, a maximum or minimum learnt action-value parameter for the next state data;
determining a first target value for training the second neural network from the maximum or minimum learnt action-value parameter for the next state data.

6. A method as claimed in claim 5 wherein the training of the second neural network comprises providing the second neural network with a representation of the first starting state data and adjusting weights of the second neural network to bring a learnt action-value parameter for an action defined by the first action data closer to the first target value.

7. A method as claimed in claim 5 wherein the first transition further comprises reward data defining a reward value or cost value resulting from an action defined by the first action data being performed, and wherein determining the target value comprises adjusting the maximum or minimum learnt action-value parameter for the first next state data by the reward value or the cost value.

8. A method as claimed in claim 2 wherein selecting the actions further comprises:
obtaining state data defining an input state of the subject system;
providing, as input to the second neural network, a representation of the input state of the system;
obtaining, as output from the second neural network, a respective learnt action-value parameter for each action of the set of actions that is available at the input state; and
selecting an action to perform having a maximum or minimum respective learnt action-value parameter.

9. A method as claimed in claim 2 wherein the training of second neural network alternates with the selecting actions and comprises incrementally updating a set of weights of the second neural network used for the selecting actions.

10. A method as claimed in claim 9 wherein the updating the first neural network from the second neural network is performed at intervals after repeated selecting of actions using the second neural network and training of the second neural network.

11. A method as claimed in claim 10 wherein updating the first neural network from the second neural network comprises copying a set of weights of the second neural network to the first neural network.

12. A method as claimed in claim 1 wherein a state of the subject system comprises a sequence of observations of the subject system over time representing a history of the subject system.

13. A method as claimed in claim 1 wherein each state is defined by image data.

14. A method as claimed in claim 1 wherein the first and second neural networks comprise deep neural networks with a convolutional neural network input stage.

15. A system for reinforcement learning, the system comprising one or more computers and one or more storage devices storing instructions that when executed by one or more computers cause the one or more computers to perform operations comprising:
obtaining training data relating to a subject system being interacted with by a reinforcement learning agent that performs actions from a set of actions to cause the subject system to change states;
wherein the training data is generated by performing a succession of actions from the set of actions to interact with the environment and comprises a plurality of transitions each including respective starting state data defining a respective starting state of the environment, respective action data defining a respective action from the set of actions, and respective next state data defining a respective next state resulting from the respective action being performed; and
training a second neural network using the training data and target values for the second neural network derived from a first neural network; and
updating the first neural network from the second neural network.

16. A system as claimed in claim 15 the operations further comprising selecting the actions performed to generate the training data using learnt action-value parameters obtained as output from the second neural network, wherein the actions are selected responsive to respective action-value parameters for each action of a set of actions available at a state of the subject system that are generated by the second neural network.

17. A system as claimed in claim 16, the operations further comprising generating the transitions by storing data defining actions selected using the second neural network in association with data defining respective starting states and next states for the actions.

18. A system as claimed in claim 17 the operations further comprising generating the target values by providing at least the data defining the next states as input to the first neural network, and training the second neural network using the target values and the data defining the starting states.

19. A system as claimed in claim 18 the operations further comprising:
selecting a first transition comprising first starting state data, first action data, and first next state data;
providing the first neural network with a representation of the first next state data;

determining, from the first neural network, a maximum or minimum learnt action-value parameter for the next state data;

determining a first target value for training the second neural network from the maximum or minimum learnt action-value parameter for the next state data.

20. A method as claimed in claim 19 wherein the training of the second neural network comprises providing the second neural network with a representation of the first starting state data and adjusting weights of the second neural network to bring a learnt action-value parameter for an action defined by the first action data closer to the first target value.

21. A method as claimed in claim 19 wherein the first transition further comprises reward data defining a reward value or cost value resulting from an action defined by the first action data being performed, and wherein determining the target value comprises adjusting the maximum or minimum learnt action-value parameter for the first next state data by the reward value or the cost value.

22. A system as claimed in claim 16 wherein the training of second neural network alternates with the selecting actions and comprises incrementally updating a set of weights of the second neural network used for the selecting actions.

23. A system as claimed in claim 22 wherein the updating the first neural network from the second neural network is performed at intervals after repeated selecting of actions using the second neural network and training of the second neural network.

24. A system as claimed in claim 23 wherein updating the first neural network from the second neural network comprises copying a set of weights of the second neural network to the first neural network.

25. A system as claimed in claim 16 wherein selecting the actions further comprises:

obtaining state data defining an input state of the subject system;

providing, as input to the second neural network, a representation of the input state of the system;

obtaining, as output from the second neural network, a respective learnt action-value parameter for each action of the set of actions that is available at the input state; and selecting an action to perform having a maximum or minimum respective learnt action-value parameter.

26. A system as claimed in claim 15 wherein a state of the subject system comprises a sequence of observations of the subject system over time representing a history of the subject system.

27. A system as claimed in claim 15 wherein each state is defined by image data.

28. A system as claimed in claim 15 wherein the first and second neural networks comprise deep neural networks with a convolutional neural network input stage.

29. One or more non-transitory computer-readable media storing instructions that when executed by one or more computers cause the one or more computers to perform operations comprising:

obtaining training data relating to a subject system being interacted with by a reinforcement learning agent that performs actions from a set of actions to cause the subject system to change states;

wherein the training data is generated by performing a succession of actions from the set of actions to interact with the environment and comprises a plurality of transitions each including respective starting state data defining a respective starting state of the environment, respective action data defining a respective action from the set of actions, and respective next state data defining a respective next state resulting from the respective action being performed; and training a second neural network using the training data and target values for the second neural network derived from a first neural network; and updating the first neural network from the second neural network.

* * * * *